US007969756B1

(12) United States Patent
Wu

(10) Patent No.: US 7,969,756 B1
(45) Date of Patent: Jun. 28, 2011

(54) REAL-TIME SWITCHING REGULATOR MONITOR

(75) Inventor: Keng C. Wu, Cranbury, NJ (US)

(73) Assignee: Lockheed Martin Corporation, Bethesda, MA (US)

( * ) Notice: Subject to any disclaimer, the term of this patent is extended or adjusted under 35 U.S.C. 154(b) by 214 days.

(21) Appl. No.: 11/873,527

(22) Filed: Oct. 17, 2007

Related U.S. Application Data

(63) Continuation-in-part of application No. 11/787,331, filed on Apr. 16, 2007, now Pat. No. 7,483,798.

(51) Int. Cl.
*H02M 1/15* (2006.01)
*H02M 3/335* (2006.01)
(52) U.S. Cl. .................. 363/46; 323/283; 363/21.13
(58) Field of Classification Search .......... 323/271, 323/272, 283; 363/21.04, 21.12, 39, 45, 363/46, 21.05, 21.13, 97
See application file for complete search history.

(56) References Cited

U.S. PATENT DOCUMENTS

| 4,918,643 A | 4/1990 | Wong |
| 5,745,355 A * | 4/1998 | Tracy et al. ..................... 363/71 |
| 6,275,161 B1 * | 8/2001 | Wan et al. ................ 340/636.15 |
| 6,367,024 B1 | 4/2002 | Ezell |
| 6,369,555 B2 * | 4/2002 | Rincon-Mora ............... 323/282 |
| 7,483,798 B2 | 1/2009 | Wu |
| 7,557,555 B2 * | 7/2009 | Wang et al. .................. 323/288 |
| 2003/0128563 A1 | 7/2003 | Rojas Romero |
| 2006/0220629 A1 * | 10/2006 | Saito et al. ..................... 323/282 |
| 2008/0272748 A1 * | 11/2008 | Melanson ..................... 323/207 |

* cited by examiner

*Primary Examiner* — Adolf Berhane
*Assistant Examiner* — Fred E Finch, III
(74) *Attorney, Agent, or Firm* — Duane Morris LLP

(57) ABSTRACT

A vehicle or other complex system includes at least one switching power converter which generates direct output voltage with inherent ripple. A voltage estimator or simulator estimates the instantaneous output ripple voltage(s) of the converter in the time domain. The estimator is preprogrammed with state equations of the power converter, for generating the estimates of the output ripple voltage of the converter. A comparator compares at least the ripple voltage of the simulator with the actual voltage of the converter, to generate a difference signal. The difference signal is evaluated to identify a fault condition. The fault condition is reported andor switches to a backup converter.

7 Claims, 10 Drawing Sheets

REAL-TIME SWITCHING REGULATOR MONITOR

CROSS-REFERENCE TO RELATED APPLICATIONS

This patent application is a continuation-in-part of application Ser. No. 11/787,331 filed Apr. 16, 2007 in the name of Wu.

FIELD OF THE INVENTION

This invention relates to monitoring systems for switched power converters, and more specifically to monitoring systems which compare unavoidable ripple with the predicted or estimated ripple.

BACKGROUND OF THE INVENTION

Switched networks and multi-state devices are commonly used in various electronic applications. Such networks include, for example, rectifiers, AC/DC converter and DC/AC inverters. The design and optimization of the non-linear switching systems require extensive mathematical modeling. In designing such a process model, it is highly desirable to be able to acquire and to understand the steady-state performance for the network in advance.

For example, the steady-state output ripple voltage is a key parameter in evaluating the performance of a switching inverter. In order to obtain such information scientists and engineers conventionally resort to conventional simulation andor modeling software. The conventional models provide few data points and do not provide a high degree of confidence. Other disadvantages of conventional simulation andor modeling software include extensive simulation time, possible model failure and uncertainty about the steady-state of the system.

Because the conventional simulations start from the so-called zero state, passing through transient initial states can be very time-consuming. Indeed, the simulated model can spend upward of several hours passing through the transient phase from the initial zero state. In addition, conventional simulations rely on differential equations that must converge at the boundary which separates two sequential states. As a result, these simulations often fail because of the complexity attributed to the unpredictable boundary conditions and the complexity of solving multiple differential equations. Finally, the conventional simulations do not detect and cannot predict when the steady state is reached.

SUMMARY OF THE INVENTION

An arrangement for monitoring a switching power converter comprises a switching power converter for converting source direct voltage to one or more specific output voltages. The switching power converter includes switches, capacitors, and inductors for effectuating the power conversion, the operation of which switches, capacitors, and inductors results in unavoidable ripple voltage. One or more loads is or are coupled to receive at least one of the output voltages, together with the ripple voltages, from the switching power converter. A voltage estimator preprogrammed with state equations of the power converter estimates the output ripple voltage of the converter in the time domain. A comparator is coupled to the power converter and to the voltage estimator, for comparing at least the output ripple voltage of the converter with the estimates of output ripple voltage of the converter to produce a difference signal representing the deviation of the output ripple voltage of the converter from the estimate of the output ripple voltage of the converter. A threshold arrangement is coupled to the comparator for receiving the difference signal, and for generating an alarm signal when the difference signal exceeds a threshold.

An arrangement according to an aspect of the invention is for monitoring a switching power converter. The arrangement comprises, a switching power converter for converting source direct voltage to one or more specific direct output voltages. The switching power converter includes switches, capacitors, and inductors for effectuating power conversion. Operation of the switches, capacitors, and inductors of the switching power converter results in output direct voltage associated with unavoidable ripple voltage. The switching power converter may be associated with one or more loads coupled to receive at least one of the output voltages, together with its ripple voltages, from the switching power converter. The arrangement includes a voltage estimator for estimating steady-state output ripple voltage of the converter in the time domain. It may also estimate the direct output voltage. The estimator is preprogrammed with state equations of the power converter, for generating the estimates of steady-state output ripple voltage of the power converter. A comparator is coupled to the power converter and to the voltage estimator, for comparing at least the output ripple voltage of the converter over a complete power converter cycle with estimates of the output ripple voltage(s) of the converter to produce a difference signal representing deviation of the output ripple voltage of the converter from the estimate of the output ripple voltage of the converter. A threshold detector is coupled to the comparator for receiving the difference signal, and for generating an alarm or fault-indicative signal when the difference signal exceeds a threshold.

A vehicle or other complex system includes at least one switching power converter which generates direct output voltage with inherent ripple. A voltage estimator or simulator estimates the output ripple voltage of the converter in the time domain. The estimator is preprogrammed with state equations of the power converter, for generating the estimates of the output ripple voltage of the converter. A comparator compares at least the ripple voltage of the simulator with the actual voltage of the converter to generate a difference signal. The difference signal is evaluated, as by thresholding, to identify a fault condition. The fault condition is reported andor switches operation to a backup converter.

DESCRIPTION OF THE INVENTION

Switching power converters which power critical electrical devices often selectively power more than one electrical device, with disparate and varying loads and from varying source voltages. For example, a given switching power converters in a modern military aircraft may be required to power many different devices, as selected by the pilot. Depending upon the electrical devices selected, the total loading of the switching power converter may be large or small. During operation of the aircraft, the pilot may select among many different devices and modes of operation, so that the load applied to the switching power converter may change from moment to moment. Also, the source of electrical power may vary in output voltage from moment to moment. These moment-to-moment changes is source voltage and load may result in large changes in the operating frequency, duty cycle, and other parameters of the switching power converter, which in turn affect the magnitude of the ripple associated with the load voltage. It is desirable to monitor the switching power converter's operating condition, so that corrective measures can be taken if failure should occur. One possible corrective measure would be to switch to a backup switching power converter.

It is possible to monitor the direct output voltage of a switching power converter by comparing the direct output voltage with upper and lower voltage limits. However, this does not take into account the fact that the ripple is a component of the output voltage of the switching power converter, and the ripple can cause one of the upper and lower thresholds, or both, to be exceeded even though the average output voltage is within the prescribed limits. For this reason, threshold-type monitors often use averaging filters. The averaging filters tend to reject rapidly-occurring changes in the output voltage. This, in turn, tends to make it difficult to use the ripple magnitude as an indicator of the condition of the switching power converter.

The slow operating speed of conventional simulators makes real-time evaluation of the operation of a physical switching power converter difficult or impossible, as the simulator "never" catches up with the rapidly-changing, dynamic, current condition of the switching power converter. The inability to rapidly simulate the end ripple condition of a switching power converter with a conventional simulator forecloses the avenue of comparing the actual converter ripple with the simulated ripple for determining the operating condition.

The disclosure generally relates to a method and apparatus for real-time monitoring of non-linear switching systems. While the novel principles are disclosed in relation to a two-state system, it is understood that the disclosure is not limited to such systems and the disclosed principles can be applied to multi-state systems having more than two-states.

Figure 1A:
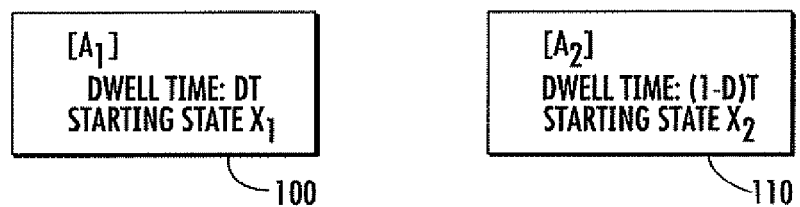
FIG. 1A is a schematic illustration of a flow diagram for a two-state system.

FIG. 1A is a schematic illustration of a flow diagram for a two-state switching system, with each of the two states being represented by a block. Under the control of an algorithm according to one embodiment, the dynamic system alternates cyclically between the two states. In FIG. 1A, box 100 represents the first state and box 110 represents the second state of an exemplary non-linear switching system. At the first state 100, the system represented can be defined by component parameters $A_1$, which can be a matrix. Similarly, the component parameters of the second state of the system are represented by $A_2$, which can also be a matrix. Dwell time for the first state 100 is identified as DT. Since the system has only two states, it follows that the dwell time of the second state is (1−D)T. Finally, each of states 100 and 110 has its corresponding starting states, $X_1$ for $[A_1]$ and $X_2$ for $[A_2]$, where the brackets represent matrices.

When the two-state system is operating in a steady state, both starting states are intimately linked.

Figure 1B:
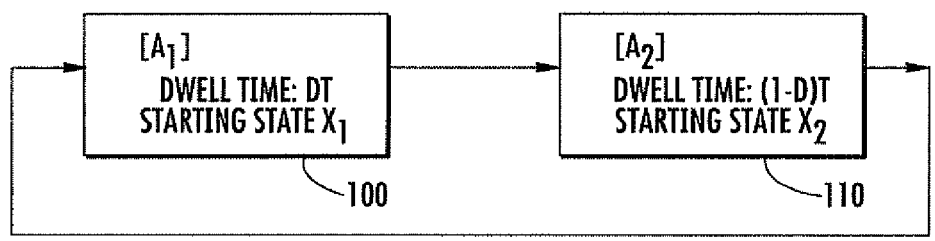
FIG. 1B is a schematic illustration of a flow diagram for a two-state system during operation.

FIG. 1B is a schematic illustration of a flow diagram for a two-state system during recurrent operation. That is, at the end of dwell time DT, $X_1$ propagates to $X_2$. By the same token, at the end of dwell time (1−D)T, $X_2$ returns to $X_1$, and the cycle repeats. This unique steady state property holds for all dynamic systems that have two stable states at certain times and can define starting states $X_1$ and $X_2$ in terms of component parameter matrices $[A_1]$ and $[A_2]$. According to one embodiment of the disclosure, once the starting states are known, the periodic steady-state behavior of the systems can be expressed without regard to the transient phase or convergence from the starting state.

Figure 2:
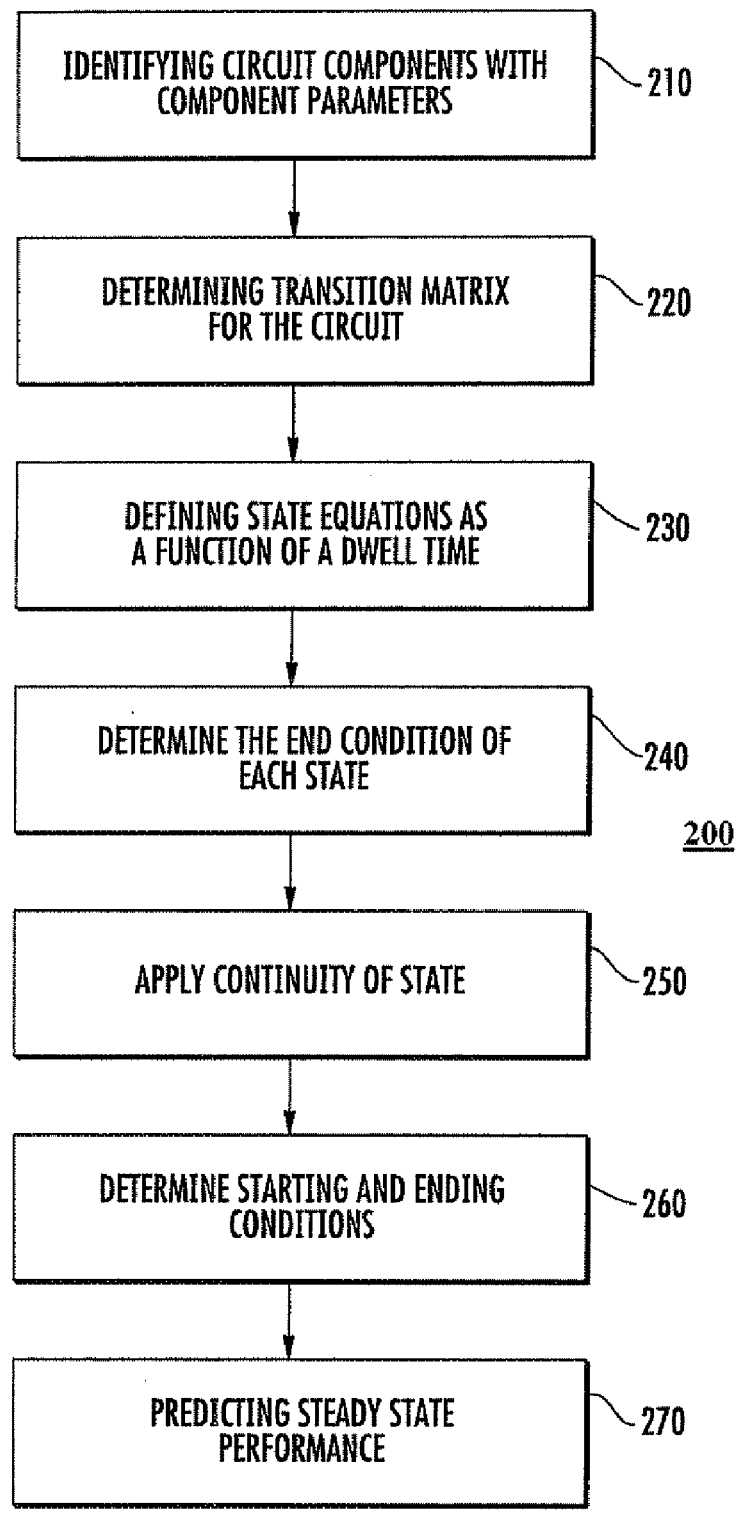
FIG. 2 is an exemplary logic flow chart or diagram as used in an embodiment of the disclosure.

FIG. 2 represents an exemplary logic flow chart or algorithm 200 according to one embodiment of the disclosure, for determining, estimating or predicting steady-state response of a nonlinear switching system, and more particularly of a switching power converter. The algorithm 200 of FIG. 2 can be implemented, for example, as a firmware or as a software directing operation of hardware. In step 210, the algorithm starts by identifying circuit components having non-linear parameters. The circuit components may include, for example, capacitors, transistors and inductors. Transistors have well-known nonlinear properties, while capacitors are nonlinear in that they include "internal" resistances which cause ohmic losses which depend on the applied voltage, and inductors are nonlinear in that they include internal resistances which cause ohmic losses which depend upon the current therethrough, and may also include nonlinear magnetic cores. The circuit components may be known in advance and provided to a computer program according to an embodiment of the disclosure. An operator can manually identify each circuit component and its parameters, or the same can be imported from an existing file.

Step 220 of algorithm 200 of FIG. 2 is directed to determining the transition matrix for the nonlinear switching converter or circuit during each state. Thus, for a two-state circuit, there can be two matrixes, each defining the circuit behavior at one state. The transition matrixes should represent the circuit dynamics responding to the starting condition at each state. From block 220, the logic 200 of FIG. 2 flows to a step 230, which defines the state equations as a function of the dwell time. The dwell time is the time that the circuit is governed by each state. The dwell time may include ramp-up time. For a circuit having two states, step 230 may include defining a first state equation and a second state equation as a function of dwell time in each state. Each of the first and the second state equations can be defined as a function of transition matrixes and circuitry components.

From block 230 of FIG. 2, the logic flows to a block 240, in which the process seeks to determine the end condition for each possible state 100, 110 of FIG. 1 as a function of a starting condition for the subsequent state 110, 100. In one embodiment, the end condition of each state corresponding to a given starting condition is obtained. This can be a steady state for a particular state 100, 110. In the step represented by block 250, the property of continuity of state is applied to the state equations. The continuity of state dictates that the ending of one state is the starting of the next state. For a two-state circuit, the ending of the first state would necessarily define the starting condition, $X_2$, of the second state. Therefore, information relating to the ending of a first state, such as 100, can be used to define the starting condition of the subsequent state 110. The continuity of state can occur at the transition boundary between the two consecutive states.

Next, in step 260 of FIG. 2, the logic flow or algorithm finds all starting and ending conditions given the continuity of state at all transition points. In the two-state case of the example, both starting conditions, $X_1$ and $X_2$, are embedded in the two equations establishing continuity at transition boundaries. It is well known in algebra that two unknowns linked in two equations can be solved with no ambiguity.

Finally, step 270 of FIG. 2 determines the steady state performance of the circuit as a combination of all its matrix, components, and starting conditions obtained in step 260. That is, the steady state performance of the circuit can be estimated as a function of the dynamic circuit components of the first state and the second state.

Figure 3:
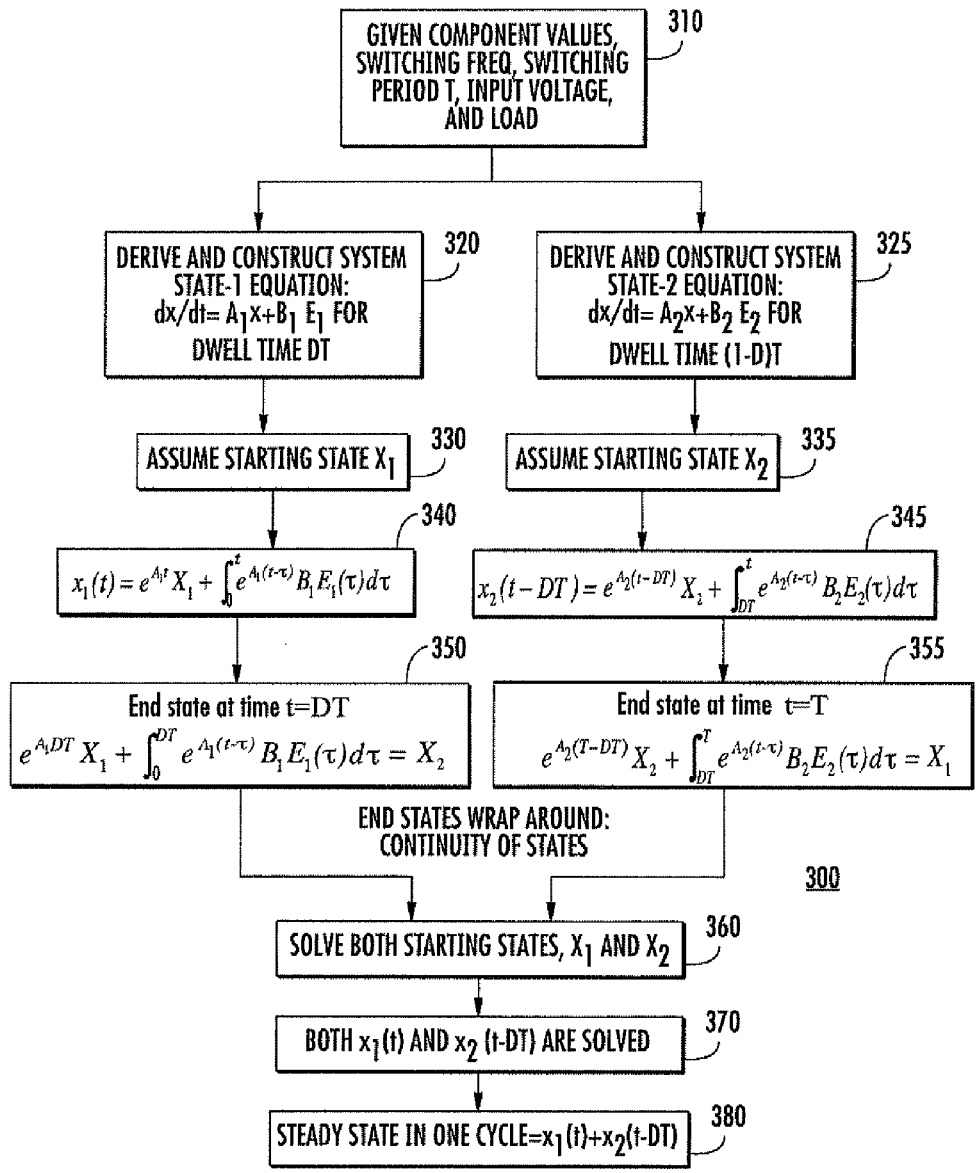
FIG. 3 is an exemplary algorithm according to another embodiment of the disclosure.

FIG. 3 illustrates an exemplary logic flow, process or algorithm 300 according to another embodiment of the disclosure. As in the exemplary algorithm 200 of FIG. 2, the algorithm shown in FIG. 3 can be implemented in an independent software associated with a hardware or it can be embedded in the processor. The exemplary process of FIG. 3 starts in step 310 by entering component values for the circuit. The components may include resistors, inductors, capacitors, transistors or any other linear or non-linear circuit component. The component values, as well as the operating conditions, including input voltage, switching frequency and loading current are known values and can be entered directly, or may be made available from a preprogrammed memory.

Assuming a two-state system, state equations for each of the first and the second states can be constructed. Specifically, steps 320 and 325 of FIG. 3 define state equations for each of the first and the second states, respectively. For a DC/DC converter, the state equation for the dwell time in the first state 100 can be defined as:

$$dx/dt = A_1 x + B_1 E_1 \quad (1)$$

In equation (1), lower case x can define a state vector representing inductor currents and capacitor voltages, and $A_1$ can define the transition matrix in the first state during dwell time DT, where D is the time-fraction of dwell per period T. For a switched DC/DC circuit having various components, elements of $A_1$ can represent interactions of structure as multiple first-order, cross-coupled differential equations. Matrix $B_1$ describes the way input energy $E_1$ enters the circuit in state 1.

Step 325 of FIG. 3 defines a similar state equation for state 2 and for the dwell time (1-D)T as:

$$dx/dt = A_2 x + B_2 E_2 \quad (2)$$

Next, the logic flow, process, or algorithm of FIG. 3 assumes a starting condition X. The upper case X stands for the cyclic starting conditions of state vector x. This assumption is represented for each state in steps or blocks 330 and 335. Once a starting condition is assumed, steps 340 and 345 determine the circuit's response given the starting condition and the corresponding circuit structure. For example, step 340 defines the structure response $x_1(t)$ for the first state as:

$$x_1(t) = e^{A_1 t} X_1 + \int_0^t e^{A_1(t-\tau)} B_1 E_1(\tau) d\tau \quad (3)$$

Equation (3) can be integrated between the integration limits of t=0 and t=DT as shown in step 350. Similarly, step 345 defines the structure response $x_2(t)$ for the second state as:

$$x_2(t-DT) = e^{A_2(t-DT)} X_2 + \int_{DT}^t e^{A_2(t-\tau)} B_2 E_2(\tau) d\tau \quad (4)$$

Equation (4) can be integrated between the integration limits of t=DT and t=T as shown in step 355 of the algorithm. In steps 350 and 355, the continuity of states is applied at the transition boundaries. The transition boundary of state 1 occurs at t=DT, where equation (3) results in $X_2$ and is written as (see step 350):

$$e^{A_1 DT} X_1 + \int_0^{DT} e^{A_1(t-\tau)} B_1 E_1(\tau) d\tau = X_2 \quad (5)$$

Equation (3) can be integrated between the integration limits of t=0 and t=DT as shown by equation (5) in step 350 of the algorithm. Since the transition boundary of state 2 occurs at t=T, Equation (4) results in $X_1$ and written as (step 355):

$$e^{A_2(T-DT)} X_2 + \int_{DT}^T e^{A_2(t-\tau)} B_2 E_2(\tau) d\tau = X_1 \quad (6)$$

Equation (4) can be integrated between the integration limits of DT and T as shown in step 355. Since the circuit is assumed to have two states and the states wrap around (see FIG. 1B), the end state $X_2$ would end up as the start state $X_1$. Consequently, equations (5) and (6) can be simultaneously solved to determine $X_1$, $X_2$, and in turn $x_1(t)$ and $x_2(t-DT)$. The steady state in one cycle can be determined according to the following relationship (step 380)

$$\text{Steady state in one cycle} = x_1(t) + x_2(t-DT) \quad (7)$$

The steps illustrated in the exemplary algorithm of FIG. 3 can be implemented in a software in communication with one or more processors and database(s). The algorithm may also be imbedded in hardware to provide a firmware. The firmware can be in communication with a database. Additionally, the firmware may receive input from an operator or from a database identifying circuit variables, such as, switching frequency, switching period, input voltage, load, component values and operating conditions. The algorithm can then determine the steady state performance of the circuit in real time and report back to the operator in significantly shorter time than the conventional methods.

While the disclosure has referenced a two-state system for simulation purposes, it should be noted that the principles disclosed herein are not limited to a two-state system and can be readily applied to multi-state systems to obtain similar results. As it will be readily apparent to one of ordinary skill in the art, the steady state equations for a tri-state system, for example, will entail a more complex calculation.

Figure 4:
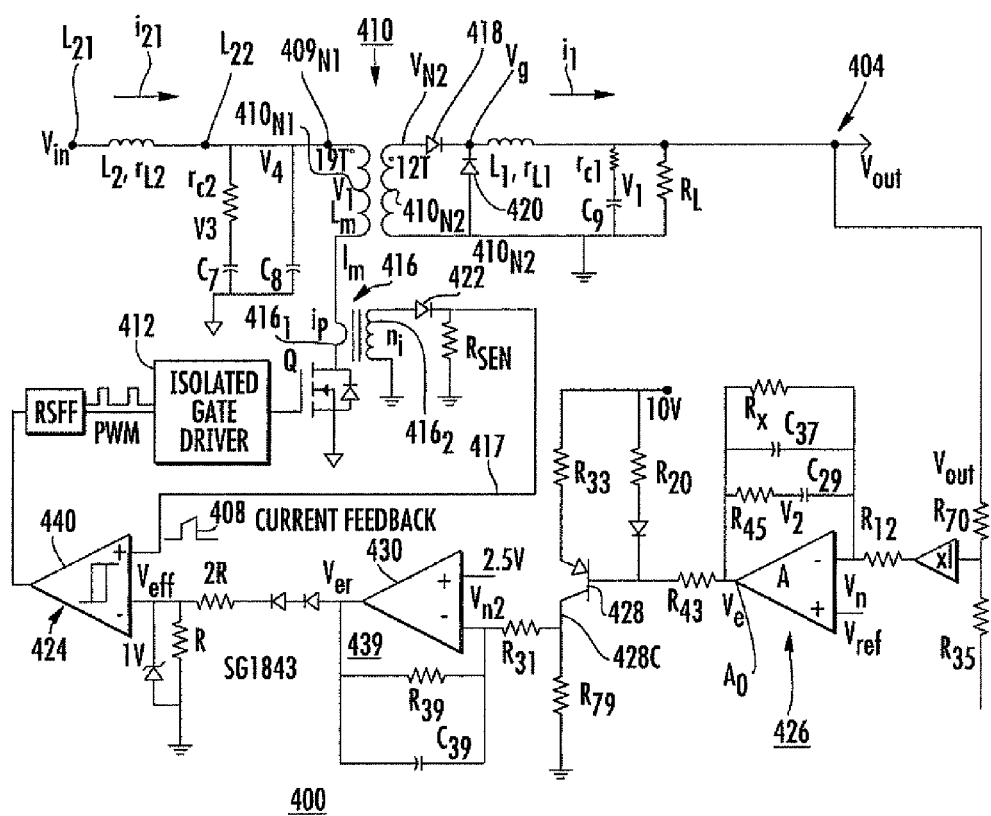
FIG. 4 is a circuit diagram for a conventional DC-DC switching converter.

FIG. 4 is a circuit diagram for a conventional DC-DC switching converter 400. The circuit of FIG. 4 is generally conventional. In FIG. 4, direct energizing voltage $V_{in}$ is applied to one end $L_{21}$ of an inductor $L_2$ with internal resistance $r_{L2}$. The instantaneous current through inductor $L_2$ is designated $i_2$. The other end $L_{22}$ of inductor $L_2$ connects to one end $409_{N1}$ of a 19-turn primary winding $410_{N1}$ of a transformer 410 having magnetic induction illustrated as $L_m$. An instantaneous voltage $V_4$ appears at end $L_{22}$ of inductor $L_2$. Inductor $L_2$ end $L_{22}$ is also connected to ground by way of a pair of paralleled capacitors $C_7$ and $C_8$. Capacitor $C_7$ is illustrated as having an internal resistance $r_{c2}$, and as having a capacitor voltage designated V3. In the arrangement of FIG. 4, the lower end of primary winding $410_{N1}$ is coupled through a primary winding $416_2$ of a current sensor 416 to a drain of a solid-state switching element Q, illustrated as a FET. The source of FET Q is connected to ground. The gate of FET Q is driven with switching waveforms by an isolated gate driver 412. Switching of transistor Q results in periodic current flow $i_m$ through the primary winding $410_{N1}$ and flow of corresponding current $i_p$ through the primary winding $416_1$ of current sensor 416. This switching induces or causes alternating instantaneous voltage $V_{N2}$ across 12-turn secondary winding $410_{N2}$. During those intervals in which transistor Q is conducting or ON, current flows through winding $410_{N2}$, and through diode 418 and inductor $L_1$ to a load $R_L$. Inductor $L_1$ is shown as having internal resistance $r_{L1}$. The current flow $i_1$ generates an instantaneous voltage $V_g$ at the cathode of diode 418. During those intervals in which transistor Q is nonconductive or OFF, the current flow through inductor $L_1$ maintains the $i_1$ current, thereby rendering diode 420 conductive and turning OFF diode 418. The current through inductor L1 then decreases as the energy stored therein is coupled to the load, until transistor Q one again turns ON, and the cycle repeats. The net result of this operation, as known, is to produce sawtooth current $i_1$ through inductor $L_1$, which current is integrated or smoothed by a filter capacitor $C_9$ to produce direct output voltage $V_{out}$ output terminal 404 and across the load $R_L$. Capacitor $C_9$ is illustrated as having internal resistance $r_{c1}$.

Also in FIG. 4, the current sensor 416 responds to the fluctuating current flow $i_p$ through transistor Q and through primary winding $410_{N1}$ by producing pulsating current $n_i$ on the secondary winding $416_2$. This pulsating current is rectified by a diode 422 for producing pulsatory voltage across a sensing resistor $R_{sen}$. The resulting pulsatory or sawtooth voltage, illustrated as 408, is generated on a conductor 417. Pulsatory voltage 408 represents the current through the primary winding $410_{N1}$ of transformer 410, and is applied to the noninverting (+) input port or terminal of a modulator arrangement 424.

The direct output voltage appearing at output terminal 404 and across the load $R_L$ in FIG. 4 is sampled by a voltage divider including resistors R35 and R70, and the sample is applied by way of a buffer $X_1$ (times one) and a resistor $R_{12}$ to the inverting input port (−) of an integrating error amplifier designated generally as 426, which includes an operational amplifier A. The integrating error amplifier 426 also includes a feedback resistor Rx, feedback capacitor $C_{37}$, and a shaping feedback network including resistor $R_{45}$ and capacitor C29. A voltage V2 appears at the junction of resistor $R_{45}$ and capacitor C29. The sample voltage appearing at the inverting (−) input port of operational amplifier A is designated $V_n$. The noninverting (+) input port of amplifier A is connected to a reference voltage supply $V_{ref}$. An error voltage $V_e$ is developed at the output port Ao of amplifier A, and is coupled through a resistor R43 to a current boosting circuit including a PNP inverter 428, resistors R33 and R79, and a base circuit including resistor $R_{20}$. The error current at the collector 428c of PNP transistor 428 is applied to an operational amplifier designated generally as 439 to boost the loop gain. Operational amplifier 439 includes an amplifier 430 and degenerative feedback network including resistor R39 and capacitor C39. Resistor $R_{31}$ in conjunction with resistor R39 and capacitor C39 sets the gain of operational amplifier 439. The voltage at the inverting (−) input port of amplifier 430 is designated $V_{n2}$. The amplified error voltage $V_{er}$ appearing at the output of operational amplifier 439 is applied to a pulse-width modulator 424 including an integrated-circuit comparator 440, which compares the ramp current feedback 408 with the current value of error voltage $V_{er}$ to produce timing pulses related to the desired width-modulated pulses. The timing pulses are applied to a reset-set flip-flop (RSFF) to generate the desired width-modulated pulses (PWM). The width-modulated pulses are applied by way of an isolator 412 to the gate of the power switch Q.

In the arrangement of FIG. 4, input voltage is $V_{in}$ and output voltage is $V_{out}$. Isolated gate driver 412 and switch Q activate/deactivate the system. Switch 412 can be a MOSFET-type switch. Given the state of switch 412, the converter cycles between two structures (or states): the On- and Off-configurations. Transition matrix $A_1$ (FIG. 1B) can define the On-configuration and transition matrix $A_2$ can define the Off-configuration. A source matrix B can also be identified. The source matrix B is equal to the product $B_1E_1$ or $B_2E_2$.

An exemplary method for determining elements for matrix $A_1$, $A_2$ or B is provided with reference to the exemplary embodiment of FIG. 4. In FIG. 4, ten state variables consisting generally of inductor currents and capacitor voltages and corresponding to the lower case x of equation (1), or (2), are identified. These ten state variables in the case of FIG. 4 are (1) $i_1$, (2) $V_2$, (3) $V_n$, (4) $V_e$, (5) $V_{n2}$ (6) $V_{er}$, (7) $i_2$, (8) $V_3$, (9) $V_4$, and (10) $i_m$ (or $i_p$). A first-order differential equation is established for each state variable and an output equation is formulated in terms of given state variables. For instance, the output voltage, $v_{out}$, can be expressed as:

$$v_{out} = \left(\frac{r_{cl} \cdot R_L}{r_{cl} + R_L}\right)i_1 + \left(\frac{R_L}{r_{cl} + R_L}\right)v_1 \tag{8}$$

In equation (8) $i_1$ is the instantaneous current through inductor $L_1$ while $v_1$ is the instantaneous voltage across $C_9$. Given the output voltage equation, a differential equation around the output loop containing inductor $L_1$, series resistance $r_{L1}$, the driving source $V_g$, and the output node 404 can be written as:

$$L_1 \frac{di_1}{dt} + r_{L1} \cdot i_1 = v_g - v_o \tag{9}$$

By plugging in the output equation and regrouping terms according to state variables, the first differential equation (9) can be rewritten as:

$$\frac{di_1}{dt} = \left[-\frac{r_{L1} + \frac{r_{cl} \cdot R_L}{r_{cl} + R_L}}{L_1}\right]i_1 + \left[-\frac{\frac{R_L}{r_{cl} + R_L}}{L_1}\right]v_1 + \frac{v_g}{L_1} \tag{10}$$

where the quantities in bracket are the first row elements for transition matrix $A_1$, or $A_2$, depending on the dwell time. By a similar procedure, the second differential equation (equation 11) and its row elements corresponding to the state variable $v_1$ can also be described as $$\frac{dv_1}{dt} = \left[\frac{R_L}{(r_{cl} + R_L)C_9}\right]i_1 + \left[-\frac{1}{(r_{cl} + R_L)C_9}\right]v_1 \quad (11)$$

It is noted that the embodiment of FIG. 4 is exemplary in nature and the principles disclosed herein can be applied to any circuit with any number of operating states. The three matrices $A_1$, $A_2$ and B enable calculating $X_1$ and $X_2$ consistent with the embodiments of the disclosure. Once $X_1$ and $X_2$ are determined, the steady state waveform for all circuit nodes can be determined.

Figure 5A:
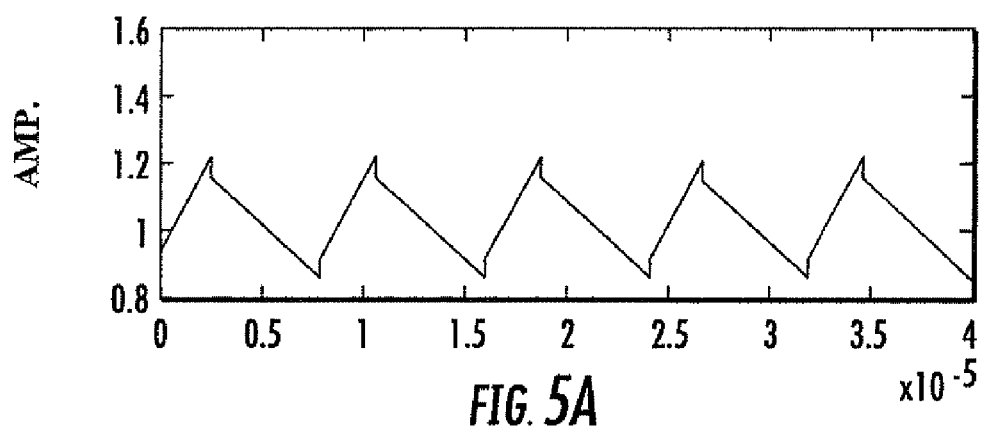
FIG. 5A is a graphic illustration of the steady state prediction for inductor current of the circuit shown in FIG. 4.
Figure 5B:
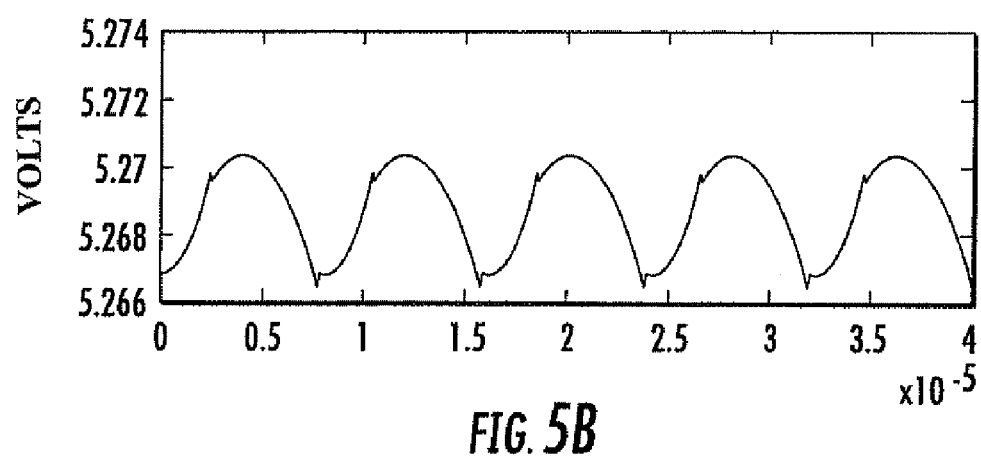
FIG. 5B is a graphic illustration of a predicted steady state output voltage ($V_{out}$) for the circuit of FIG. 4.

Using an algorithm consistent with the disclosure, the predicted and actual actuation converter measurements were plotted for the circuit of FIG. 4. FIG. 5A is a graphic illustration of the predicted converter current output for the circuit shown in FIG. 4. Specifically, FIG. 5A shows the predicted inductor ($L_1$, FIG. 4) current $i_1$ at the output. FIG. 5B shows the predicted converter output voltage, $V_{out}$ in FIG. 4).

It can be seen from FIGS. 5A and 5B that the predicted inductor current $i_1$ cycles between 0.9 to 1.2 Amp, while the predicted voltage output cycles, at steady state, at about 5.268 volt. The simulation time for this experiment took only four to five seconds to produce the steady state, which is a significant improvement over the conventional methods.

Figure 5C:
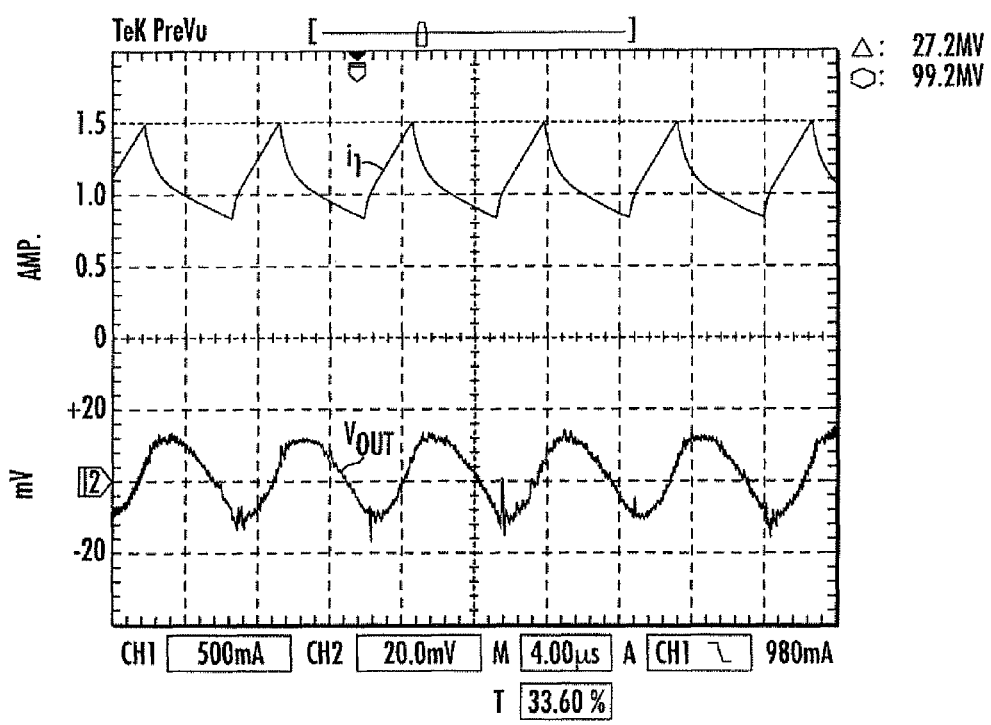
FIG. 5C shows the actual converter measurements for the circuit of FIG. 4 at steady state.

FIG. 5C shows the actual converter measurements for the circuit of FIG. 4. In FIG. 5C, the actual inductor $L_1$ current ($i_1$) in Amperes is shown on top and the actual voltage output $V_{out}$ ripple, ac-coupled, is shown on the bottom of the chart. The designation "2" for trace 2 represents the ac-coupled zero voltage. The magnitude of the ripple voltage component $V_{out}$ is about 20 millivolts (mV) peak-to-peak. From FIGS. 5A, 5B and 5C, it can be readily seen that the steady state prediction according to the embodiments disclosed herein can provide fast and accurate prediction.

Figure 6:
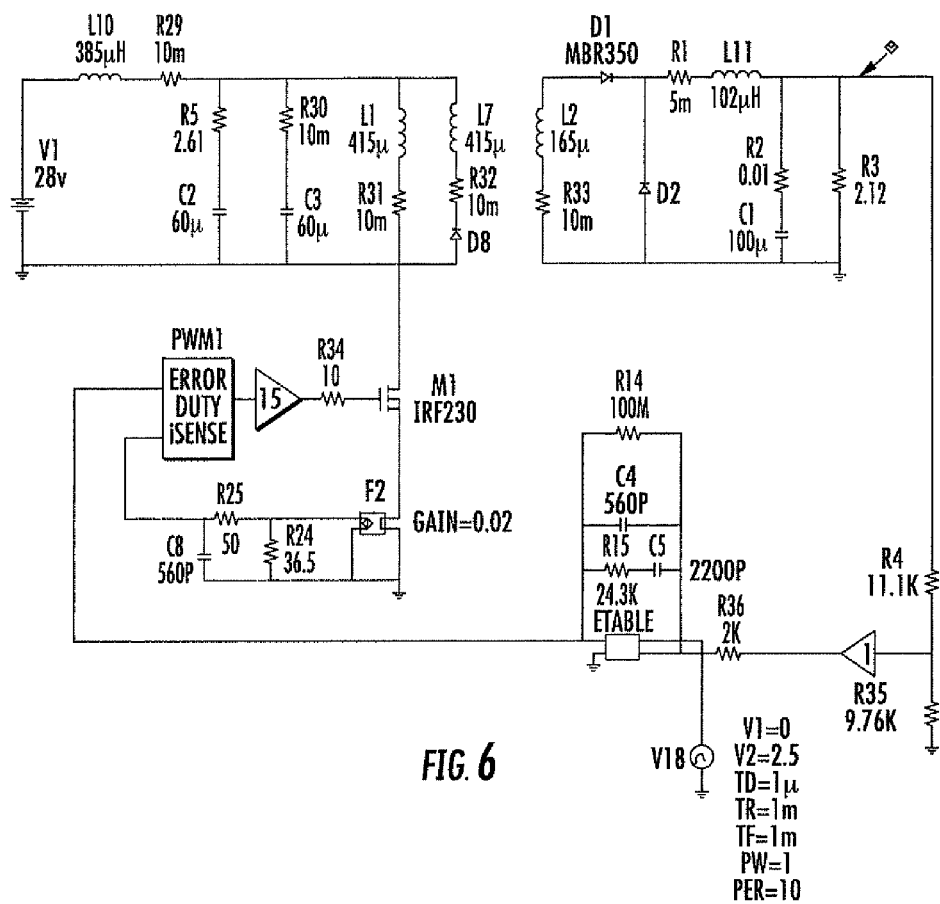
FIG. 6 is a simplified circuit file (circuit simulation) for a DC/DC converter similar to that of FIG. 4.

In order to compare the predicted steady state according to an embodiment disclosed herein with the conventional methods, a conventional software was programmed corresponding to a simplified circuit similar to the converter of FIG. 4. FIG. 6 shows a simplified simulation circuit (file) for a DC/DC converter similar to that of FIG. 4 which was used with a conventional simulation program. The circuit components of FIG. 6 are conventional and therefore will not be discussed in detail. For a 10 ms observation time including turn-on transient, the conventional simulation software took about 10 minutes to complete its prediction.

Figure 7:
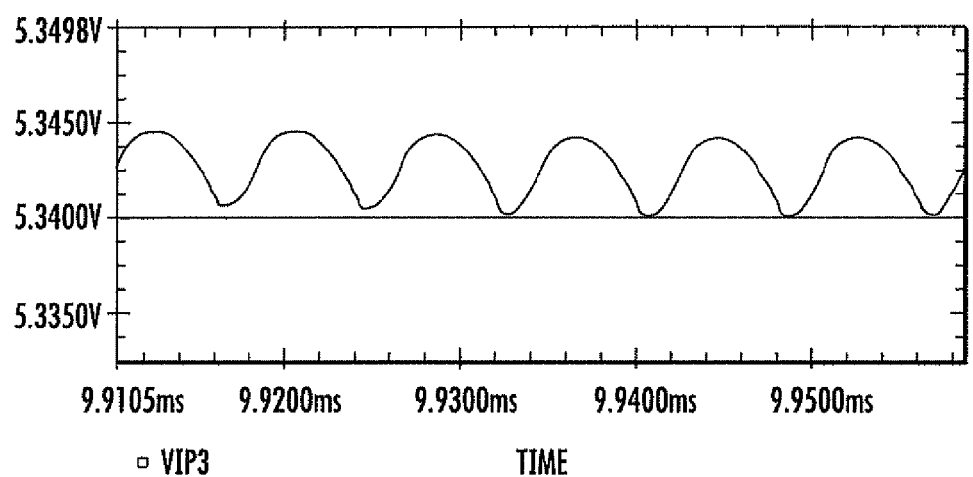
FIG. 7 is a graphic illustration of the predicted output voltage ($V_{out}$) for the simplified circuit of FIG. 6 using a conventional simulation program.

FIG. 7 is a graphic illustration of the predicted output voltage ($V_{out}$) for the simplified circuit of FIG. 6 using a conventional simulation program. The conventional simulation program took over 10 minutes to produce the steady state prediction waveform of FIG. 7. The simulation waveform of FIG. 7 shows that it has not yet reached steady state as evident with reference to a constant voltage 5.340 V. A longer observation time of 50 ms, again including turn-on transient, was conducted. The simulation time was about 30 minutes. However, the output voltage still failed to reach steady state of 5.300 volt.

Compared with the embodiments disclosed herein, the conventional simulation programs had the following shortcomings: (1) very long simulation time; (2) output did not reach steady state thereby leaving the results questionable; (3) to enable complete simulation without failure, circuit model and several component values had to be adjusted which rendered the simulated circuit inconsistent with the actual circuit; (4) the effects of load change also required prolong simulation time and suffered from the same deficiencies; (5) the conventional simulations had a high risk of convergence failure in the course of transient settling; (6) the conventional simulation programs required human intervention to view the analysis results in detail; and (7) the conventional simulation programs required more manual processing for harmonic or power evaluations.

In contrast, the methods disclosed herein enable re-computing $X_1$, $X_2$ and system state variables, given new $A_1$ and $A_2$ matrixes. Moreover, the embodiments disclosed herein can provide a predicted behavior almost immediately, depending on the complexity of the circuit. Since there is no transient state involved in the disclosed algorithms, there is no risk of convergence issues and computation time is consistently in the order of 2-3 second for each new operating condition. In one embodiment, the power dissipation, harmonic studies and other evaluations can be included in a database or a source file for future reference. Thus, the embodiments disclosed herein do not require additional human intervention or post processing assessments.

Figure 8:
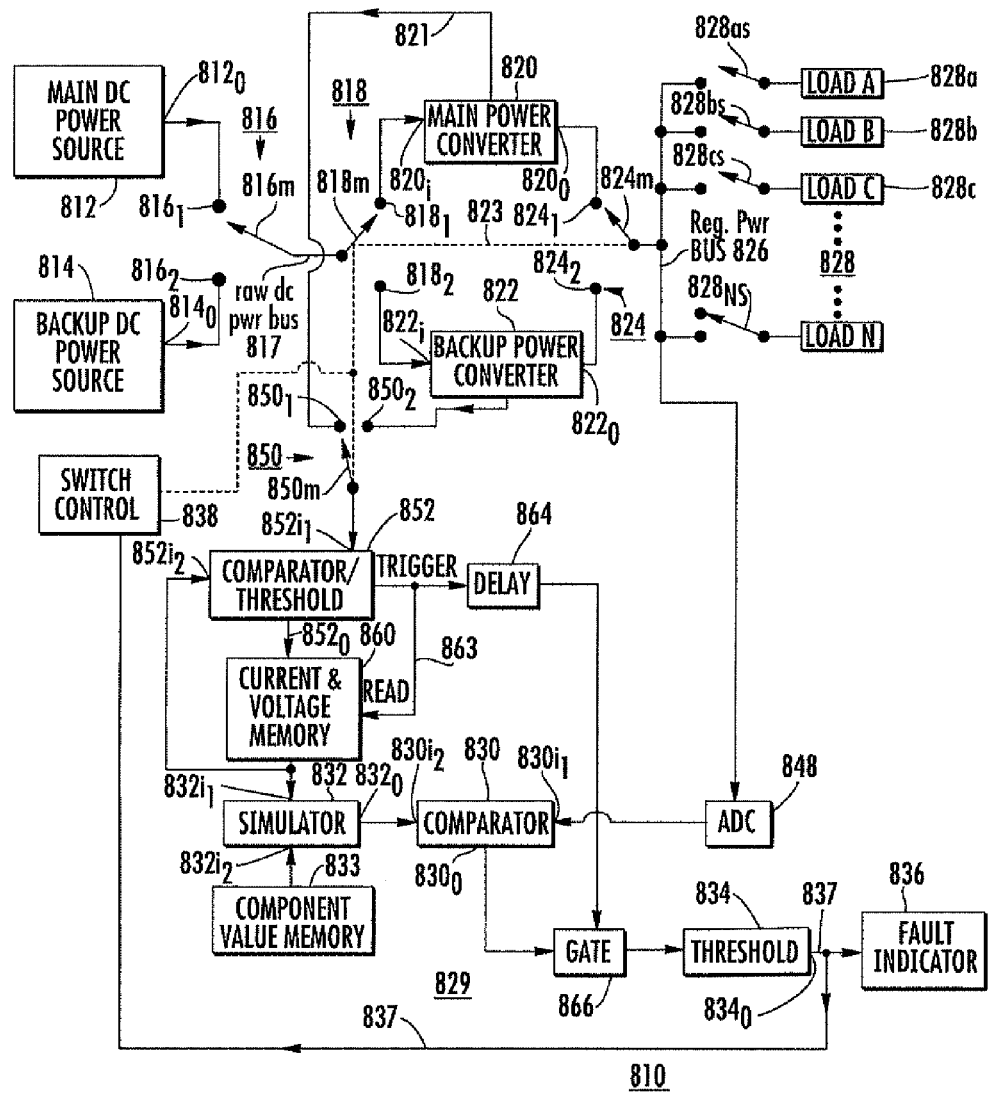
FIG. 8 is a simplified diagram, partially is block form, illustrating an aspect of the invention.

According to an aspect of the invention, the above-described high-speed method for simulating the stable state of a switching converter is used for real-time monitoring of a switching converter subject to varying loads and possibly varying sources. FIG. 8 is a simplified block diagram of an exemplary system, which may be mounted, for example, on an aircraft. In the arrangement of FIG. 8, an airplane 810 includes a first or "main" raw power source 812, which may be, for example, an alternator-regulator arrangement for generating raw direct voltage from an engine. The aircraft 810 also includes a back-up raw power supply 814. Power is supplied to a raw power bus 817 by way of a switching arrangement illustrated as a mechanical single-pole double-throw switch 816. Those skilled in the art know that mechanical switches are often, or almost universally, replaced by solid-state equivalents, but mechanical switches are very suitable for simplified explanation. As illustrated in FIG. 8, switch 816 includes a terminal $816_1$ coupled to the raw output voltage port 812o of source or supply 812, and a second terminal $816_2$ coupled to the raw voltage output port 8140 of source 814. A "movable" switch element $816m$ is selectively connected to either terminal $816_1$ or to $816_2$, to thereby couple the selected one of the main or backup raw voltages to raw voltage bus 817. Control of switch 816 may be by the pilot of the aircraft based upon status inputs, or it may be automatic. While only one backup source is illustrated, there may be more than one, with appropriate changes to the number of throws of switch 816. When switch 816 is in the illustrated position, raw power is coupled from source 812 to bus 817.

The aircraft 810 of FIG. 8 also includes a main power converter 820 and a backup power converter 822. Raw power from bus 817 is applied by way of a single-pole, double-throw selector switch 818 to power input ports $820_i$ or $822_i$, respectively, of power converters 820 and 822. More particularly, switch 818 includes a terminal $818_1$ which connects to input port $820_i$ and a terminal $818_2$ which connects to input port $822_i$, and a "movable" element $818_m$ which selectively connects bus 817 to either terminal $818_1$ or $818_2$. In the illustrated position of switch 818, raw power from bus 817 is applied to input port 820i of switching converter 820. While only one backup switching converter is illustrated, more can be used. In the arrangement of FIG. 8, a single-pole, double-throw switch 824 includes a terminal $824_1$ which is connected to an output port 8200 of switching power converter 820, and also includes a terminal $824_2$ which is connected to an output port 822o of switching power converter 822. Switch 824 further includes a "movable" element $824_m$ which selectively connects a regulated power bus 826 to receive power from either terminal $824_1$ or $824_2$. In order to guarantee that the regulated power bus 826 is always connected to an energized power converter, the movable element 824m of switch 824 is ganged with the movable element 818m of switch 818, as suggested by dash line 823. In this context, ganging relates to simultaneous or synchronous operation, so that, for example, the inputs and outputs of the same switching power converter are connected to sources and loads, respectively. Thus, in the illustrated positions of switches 816, 818, and 824 of FIG. 8, raw power from source 812 is coupled to switching converter 820, and regulated power is coupled from switching converter 820 to regulated power bus 826.

A set of loads 828 including a plurality of switchable loads is illustrated as being coupled to regulated power bus 826 of FIG. 8. More particularly, a first load 828a is coupled to bus 816 by way of a switch 828aS, a second load 828b is coupled to bus 816 by a switch 828bS, a third load 828C is coupled to bus 816 by a switch 828cS, . . . , and another load 828N is coupled to bus 826 by way of a switch 828NS. In the illustrated positions of the switches 828, none of the loads are energized. The loads of set 828 may power many or most of the equipments aboard the aircraft 810. As a simple example, load 828a may represent a target acquisition radar, turned ON or energized by the action of a pilot in operating switch 828a9, which places a sudden load on the switching converter supplying bus 826. While the radar scans to acquire a target, the pilot may operate switch 828bS, to thereby command a missile to be armed. The operation of switch introduces a sudden increase in the load on bus 826, and this may be a sudden heavy load. The pilot may then operate switch 828cS to command firing of the missile, which requires operation of further equipment for releasing the missile and initiating ignition of the missile's engine. There may be many other types of equipment which are carried by and powered from the aircraft's bus, such as navigation equipment, sensors, and the like.

It will be appreciated that it may not be possible to conveniently monitor in real time the operation of a switching power source such as source 820 of FIG. 8, considering the potential for rapid variation in the number of loads and rapid variation of the power drawn by each load. According to an aspect of the invention, a monitoring arrangement, illustrated generally as 829 of FIG. 8, performs a rapid simulation of the output state of the currently operating switching power source, to thereby produce a simulation of the steady-state voltage including the ripple content. The simulated output voltage is then compared over some period or operating cycle with the actual output voltage, and a discrepancy exceeding an allowable level is used to give a fault indication to alert the pilot, or can directly operate ganged switches 818 and 824, to switch to the backup switching power converter.

In the arrangement of FIG. 8, analog voltage from regulated bus 826 is applied to an analog-to-digital converter (ADC) 848, which generates an equivalent digital representation. The digital representation is coupled to an input port $830i_1$ of a comparator 830, and a simulator 832 is coupled to an input port $830i_2$. Simulator 832 receives at an input port $832_{i2}$ the values of all the components of power converters 820 and 822 from an associated memory 833. Since the power converters are identical (although this is not strictly necessary), the same values can be used for each power converter simulation. If the power converters should have different component values, memory 833 can be modified to include the appropriate values. Simulator 832 also receives at an input port $832_{i1}$ the voltages and currents from the selected or active one of the power converters. More particularly, the relevant voltages and currents of main power converter 820 are conveyed to a switch terminal set $850_1$ of a switch 850 by a bus 821, and the relevant voltages and currents of backup power converter 822 are conveyed to switch terminal set $850_2$ by way of a path or bus 823. The voltages and/or currents from power converters 820 or 822 are coupled to a comparator/threshold 852, depending upon the state of movable switch element 850m. Switch 850 is ganged with switches 818 and 824, so that the operating power converter provides voltages and currents to comparator/threshold 852. Comparator/threshold 852 compares the current values of voltages and currents in the currently operating power converter, as applied to port $852_{i1}$ with the corresponding older values stored in a memory 860, which are applied to input port $852_{i2}$. As the converter operates and the various loads and source voltages change, the operating current and voltage values may change. Comparator/threshold 852 compares the stored and current values, and when any one of the parameters has changed by the threshold amount (which may differ among the various voltages and currents), a trigger signal is generated on a path 863, indicating a change in operating condition. The trigger signal is applied over a path 863 to a READ input port of memory 860, which loads and temporarily stores the now-current or new values of voltage and current. The trigger signal is also applied to a delay circuit 864.

Thus, the most recent converter voltages and currents are applied from memory 860 to input port $832_{i1}$ of simulator 832, and the known converter element or component values are applied from memory 833 to port $832_i$. Simulator 832 uses the principles described above for digitally generating or simulating the output voltage expected from the then-operating switching power converter, given its operating parameters, as described above, over at least a complete operating cycle of the power converter. The simulated output voltage is applied from output port 832o to an input port $830_{i2}$ of comparator 830. The difference between the simulated converter output voltage and the actual converter output voltage is generated by comparator 830 and appears at its output port 830o. There is a time required for the simulation of simulator 832 to settle. Thus, until the simulator settles, a difference may exist between the simulator output and the actual output of the currently operating converter. The difference output of comparator 830 is applied by way of a gate 866 to a threshold circuit illustrated as a block 834. Gate 866 is triggered into conduction at a time after the trigger signal which equals the delay of block 864. In one embodiment, in which the simulation settling time is three seconds, the delay of block 864 may be four seconds. When the difference between the simulated output voltage and the actual output voltage exceeds a threshold, threshold block 834 produces a fault signal. The fault signal may be applied by way of a path 837 to a fault indicator illustrated as a block 836 andor to a switch controller illustrated as a block 838. The fault indicator may be a warning light presented to the pilot in the case of an aircraft. The switch control block 838 may respond to the failure indication from threshold block 834 by causing ganged switches 818, 824 to assume the alternate state, to thereby bring the backup power converter 822 on-line, replacing the presumably failing or failed power converter 820.

Figure 9:
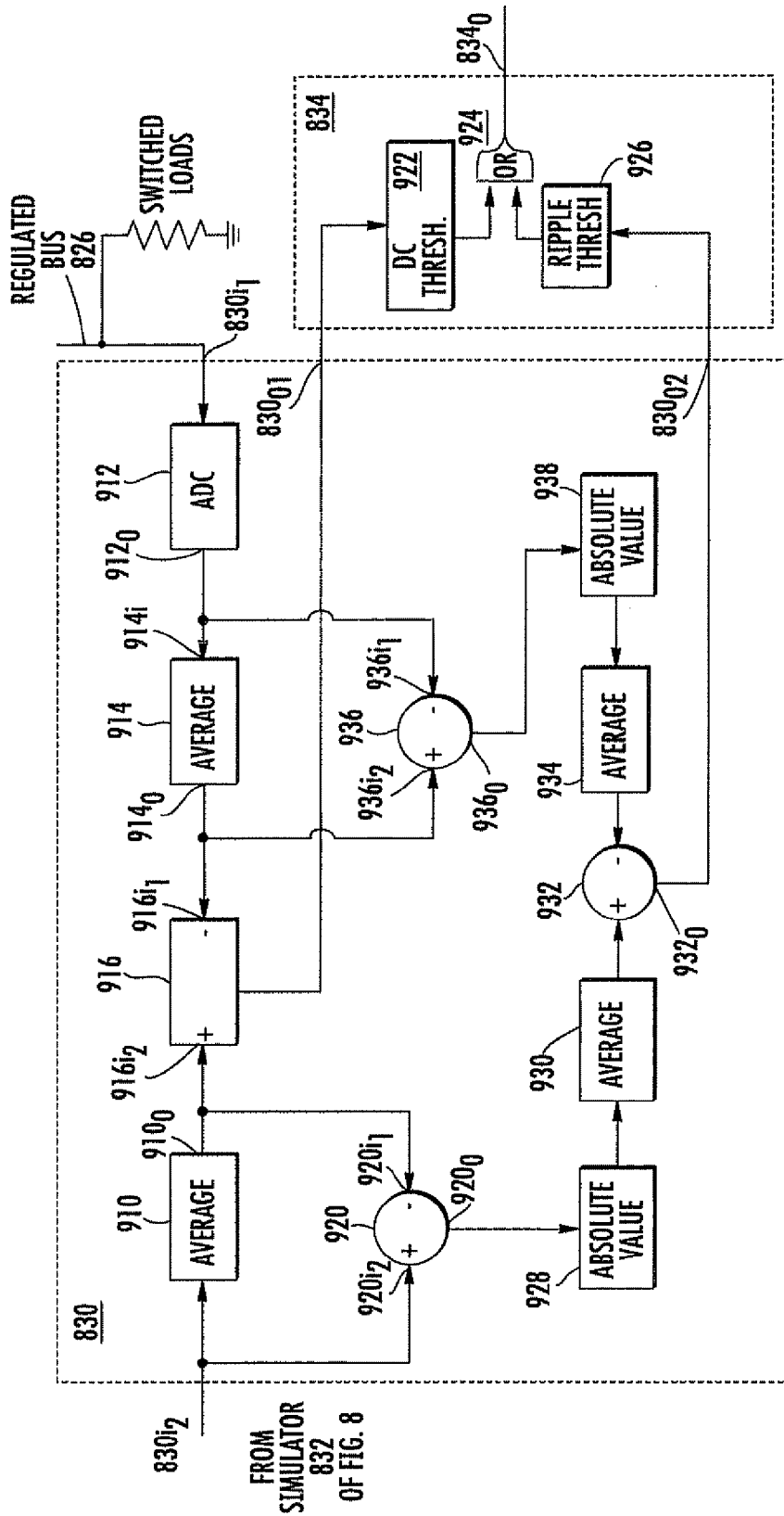
FIG. 9 is a simplified logic flow chart or diagram illustrating the operation of a simulator of FIG. 8.

FIG. 9 is a simplified block diagram of one possible embodiment of a comparator 830 and threshold 834. In FIG. 9, the digital simulation of the converter voltage, including ripple component, is applied by way of port $830i_2$ to a first digital averaging circuit 910, which produces at its output port 910o a digital value equal to the direct component of the simulated converter voltage.

The actual power converter output voltage is analog, and may already have been converted to digital form. If not, the analog voltage is applied by way of an input port $830i_1$ to an analog-to-digital converter illustrated as a block 912. The resulting digitized version of the actual power converter output voltage is generated at output port 912$o$ of block 912. The digitized actual power converter voltage is applied to an input port 914$i$ of an averaging circuit illustrated as a block 914. The direct component of the actual power converter voltage appears at output port 9140 of averaging block 914. The direct component of the actual power converter voltage is applied from port 9140 of averaging circuit 914 to input port 916$i_i$ of a summing or differencing (+−) circuit 916, and the direct component of the simulated power converter output voltage is applied from port 9100 of averaging circuit 910 to input port 916$i_2$ of summing circuit 916. The difference between the two direct component values is generated at output port 9160 of summing circuit 916, and becomes an output of comparator 830 at port 830$o_1$. This difference voltage can be compared with a direct threshold portion 922 of threshold block 834. If the direct voltage (dc) threshold is exceeded, threshold block 922 applies a fault signal to an input of an OR gate 924.

In FIG. 9, the average or direct component of the simulated power converter output voltage is applied to the inverting (−) input port 920$i_1$ of a summing circuit 920, and the simulated switching converter voltage is applied to the noninverting (+) input port 920$i_2$. The difference between the simulated value with ripple and the average value is the ripple component itself, which appears at output port 920$o$. The ripple component is "rectified" by an absolute-value block 930, and the rectified ripple is averaged by a block 930. Similarly, the actual switching converter voltage is applied from port 9120 of ADC 912 to the inverting (−) input port 936$i_1$ of a summing circuit 936. The averaged or direct component of the actual switching circuit voltage is generated at output port 914$o$ of averaging block 914, and is applied to input port 936$i_2$ of summing circuit 936. The difference between the actual value with ripple and the average value is the actual ripple component itself, which appears at output port 9360. The ripple component from port 936$o$ is "rectified" by an absolute-value block 938, and the rectified ripple is averaged by a block 934. The average value of the simulated ripple is applied from output port 930$o$ of averaging block 930 to the noninverting input port of a summing block 932, and the average value of the actual ripple is applied from averaging block 934 to the inverting input port of summing block 932. The difference between the simulated ripple and the actual ripple at output port 9320, if large, represents a potential fault. The difference value is coupled from port 9320 to a ripple threshold block 926, which determines if the ripple difference is to be deemed a fault. If a fault is declared by ripple threshold block 926, a fault signal is applied to an input port of OR circuit 924. OR circuit 924 produces a fault indication at its output port, corresponding to port 834$o$, in the event that a direct fault signal is applied to its input from dc threshold 934 or a ripple fault signal is applied to its input from ripple threshold 926.

Referring once again to FIG. 8, the fault indication produced by threshold block 834 may be applied to operate a fault indicator 836 available to the pilot, or it may be applied by way of a path 837 to a block 838, which controls the switching state or condition of ganged switches 818, 824, and 835, to bring a spare switching power converter on-line.

Another possible way to compare the simulated converter output with the actual converter output would be to synchronize the simulator 832 to the converter, digitize the converter output voltage, and perform a sample-by-sample comparison of the output voltage with the simulator output voltage. A difference or error signal would then be generated, which could be applied to a threshold device corresponding to block 834, which may include an averaging function to prevent identification of a single transient error as being a total failure.

The above description is not intended and should not be construed to be limited to the examples given but should be granted the full breadth of protection afforded by the appended claims and equivalents thereto. Although the disclosure is described using illustrative embodiments provided herein, it should be understood that the principles of the disclosure are not limited thereto and may include modification thereto and permutations thereof.

Thus, an arrangement (829) for monitoring a switching power converter (820, 822) according to an aspect of the invention comprises a switching power converter (820, 822) for converting source direct voltage (812, 816) to one or more specific output voltages. The switching power converter (820, 822) includes switches, capacitors, and inductors (400) for effectuating the power conversion, the operation of which switches, capacitors, and inductors results in unavoidable ripple voltages (FIG. 5C). One or more loads (828) is or are coupled to receive at least one of the output voltages, together with the ripple voltages, from the switching power converter (820, 822). A voltage estimator (832) for estimating the output ripple voltage of the converter in the time domain is preprogrammed with state equations of the power converter, for generating estimates of the output ripple voltage of the power converter (820, 822). A comparator (830) is coupled to the power converter (820) and to the voltage estimator (832), for comparing at least the output ripple voltage of the converter (820, 822) with the estimates of output ripple voltage of the converter (820, 822) to produce a difference signal representing the deviation of the output ripple voltage of the converter from the estimate of the output ripple voltage of the converter. A threshold (834) arrangement is coupled to the comparator (832) for receiving the difference signal, and for generating an alarm signal (836) when the difference signal exceeds a threshold. In another embodiment, the threshold (834) produces a fault signal which replaces (838) the presumably failed switching power converter with a backup unit.

What is claimed is:

1. An arrangement for monitoring a switching power converter for converting source direct voltage to one or more specific output voltages, said switching power converter having circuit components including switches, capacitors, and inductors for effectuating the power conversion, the operation of the switches, capacitors, and inductors resulting in a ripple voltage, said arrangement comprising:

a voltage estimator for estimating the output ripple voltage of said converter in the time domain, said estimator using data about parameters of the circuit components having non-linear parameters and two or more state equations corresponding to two or more states that said power converter switches between, for generating said estimate of the output ripple voltage of said power converter;

a comparator coupled to said power converter and to said voltage estimator, for comparing at least said ripple voltage of said converter with the estimate of output ripple voltage of said converter to produce a difference signal representing the deviation of said ripple voltage of said converter from the estimate of said ripple voltage of said converter; and a threshold arrangement coupled to said comparator for receiving said difference signal, and for generating an alarm signal when said difference signal exceeds a threshold.

2. The arrangement of claim 1, wherein the voltage estimator comprises software implemented with one or more processors.

3. A vehicle includes:
   - at least one switching power converter which generates direct output voltage with a ripple;
   - a voltage estimator or simulator which estimates the ripple voltage of the converter in the time domain, said estimator or simulator using data about parameters of circuit components of the power converter having non-linear parameters and two or more state equations corresponding to two or more states that said power converter switches between, for generating the estimate of the ripple voltage of the converter;
   - a comparator which compares a voltage of the estimator or simulator, including at least the estimate of the ripple voltage, with the voltage of the converter, to generate a difference signal;
   - a threshold which evaluates the difference signal to identify a fault condition;
   - a backup switching power converter; and
   - switches coupled to said threshold and to said backup switching power converter for switching operation from said switching power converter to said backup switching power converter in the event of a fault.

4. The vehicle of claim 3, wherein the voltage estimator is implemented in software executed by one or more processors.

5. A vehicle includes:
   - at least one switching power converter which generates direct output voltage with a ripple;
   - a voltage estimator or simulator which estimates the output ripple voltage of the converter in the time domain, said estimator or simulator using data about parameters of circuit components of the power converter having non-linear parameters and two or more state equations corresponding to two or more states that said power converter switches between, for generating the estimates of the output ripple voltage of the converter;
   - a comparator which compares at least the ripple voltage of the estimator or simulator with the voltage of the converter, to generate a difference signal;
   - a threshold which evaluates the difference signal to identify a fault condition; and
   - a fault indicator coupled to said threshold for reporting in the event of a fault.

6. A vehicle according to claim 5, further comprising a gate coupled to said threshold, for delaying reporting of said fault condition to said fault indicator.

7. The vehicle of claim 5, wherein the voltage estimator is implemented in software executed by one or more processors.

* * * * *